United States Patent [19]

Groszek et al.

[11] 4,183,757

[45] Jan. 15, 1980

[54] TREATMENT OF UNDERWATER SURFACES

[75] Inventors: Aleksander J. Groszek, London; Colin W. Parkes, Peachey, Nr. Uxbridge; Denis Windle, Highwycombe, all of England

[73] Assignee: The British Petroleum Company Limited, London, England

[21] Appl. No.: 884,399

[22] Filed: Mar. 8, 1978

Related U.S. Application Data

[63] Continuation of Ser. No. 735,617, Oct. 26, 1976, abandoned, which is a continuation of Ser. No. 556,447, Mar. 7, 1975, abandoned.

[30] Foreign Application Priority Data

Mar. 13, 1974 [GB] United Kingdom ............... 11183/74
Mar. 13, 1974 [GB] United Kingdom ............... 11189/74

[51] Int. Cl.$^2$ .......................... C09D 5/08; C09D 5/14
[52] U.S. Cl. .............................. 106/14.11; 106/14.18; 106/14.34; 106/14.37; 106/18.29; 106/271; 427/416
[58] Field of Search ............... 106/14.11, 14.34, 15 R, 106/271, 18.29; 114/67 R; 427/416, 442; 428/467

[56] References Cited

U.S. PATENT DOCUMENTS

| 3,374,100 | 3/1968 | Goldstein et al. | 106/10 |
| 3,709,708 | 1/1973 | Strazdins | 106/271 |
| 3,738,851 | 6/1973 | Jarvis | 106/271 |

FOREIGN PATENT DOCUMENTS

1220244 1/1971 United Kingdom .
1336103 11/1973 United Kingdom .

*Primary Examiner*—Lorenzo B. Hayes
*Attorney, Agent, or Firm*—Morgan, Finnegan, Pine, Foley & Lee

[57] ABSTRACT

Surfaces intended for underwater use, e.g. ships hulls, are coated with wax as an aqueous dispersion. The dispersion may contain 15–75% wax, and have a viscosity of 1.5 to 75 Engler at 20° C., giving coatings of 5–500 micrometers thick. The dispersion may be formed by emulsifying molten wax and water in the presence of 0.2 to 10% wt of an agent and cooling the emulsion. Anionic emulsifying agents are preferred and preferably water is added to wax. The average wax particle size in the dispersion may be from 0.05 to 10 micrometers.

13 Claims, No Drawings

TREATMENT OF UNDERWATER SURFACES

This is a continuation of application Ser. No. 735,617 filed Oct. 26, 1976, which, in turn, was a continuation of application Ser. No. 556,447 filed Mar. 7, 1975, both now abandoned.

This invention relates to a process for the treatment of underwater surfaces to reduce surface roughness and corrosion.

Surface roughness increases resistance to motion, thereby reducing a ship's speed and increasing its fuel consumption.

Surface roughness is of two types—intrinsic and extrinsic.

Intrinsic surface roughness depends on the state of the hull before painting, the care with which it is prepared before painting, the conditions under which the various layers of paint are applied, and, after a ship has been in service, the extent of deterioration of the paint work and the amount of corrosion which has taken place.

Extrinsic roughness is caused by fouling. This is an accumulative process in which marine organisms become attached and grow over an extended period of time. A fresh surface submerged in the sea becomes coated with a primary glycoprotein film within a matter of hours. This film acts as a substrate for bacteria which attach themselves by means of acidic polysaccharides. Diatoms and stalked protozoa become attached and grow after the bacterial film has become established. After longer periods of immersion two other principal types of fouling may be observed. The first class consists of algal growth, commonly referred to as weed fouling, and examples of such "weed" are Enteromorpha and Ectocarpus species. The second class consists of hard-shell organisms, e.g. the stalked and acorn varieties of barnacles.

The combined surface roughness of these types and the amount of drag which this produces is a source of considerable expense to ship owners. For a speed loss of 1 knot, 24 days are lost per year. At 1974 charter rates this loss can be reckoned, in the case of a large crude oil carrier, as several hundred thousand pounds/year.

Intrinsic surface roughness can be kept down by skilled and careful workmanship carried out under good conditions, but even so, it cannot be eliminated. In many cases the paint has to be applied in adverse circumstances which leave a considerable degree of surface roughness.

In order to combat marine growth, an anti-fouling paint is usually applied as the top coat. This contains toxic materials, such as cuprous oxide, which are slowly leached out. The leaching process cannot be uniformly controlled and is undesirably rapid immediately after a vessel enters or re-enters service, with the result that higher concentrations of toxic material than are necessary are present around the ship initially, resulting in waste and pollution, and lower concentrations subsequently, resulting in a build up of marine growth. Furthermore, conventional anti-fouling paints produce an electrically polarised surface which roughens with age and encourages the primary film formation mentioned above. While sufficient toxins are being exuded, bacterial growth is inhibited, but when this is no longer the case, growth is encouraged.

When marine growth occurs under these conditions, it adheres strongly to ships' hulls and is usually removed by dry-docking, scraping and re-painting, an expensive and time-consuming procedure. Alternatively, some limited improvement can be achieved by high pressure water hosing or mechanical scrubbing. However, because of the porous nature of the paint the roots of the growth are not removed, so the improvement is only transient.

Thus the ship owner is faced with the problem of choosing short but frequent, or infrequent but longer, periods while his ship is out of commission.

To avoid the problem set out above, it has been proposed to coat ship's hull with a film of wax. Thus U.K. Pat. No. 1,336,103 claims a method of temporarily protecting a ship's hull after launching with a coating of wax. The complete specification of U.K. Patent Application No. 50525/73 claims a method of providing protection against fouling to a surface destined to be below water during use which comprises applying a wax layer to the surface, optionally over a paint coat, the layer being formed by spraying molten wax on to the surface (or paint coat where provided) and allowing it to harden in situ to form the layer. The sprayed layer may be smoothed by at least partially remelting it with a smoothing tool.

Practical experience with wax coatings on oil tankers and experimental results obtained from test plates immersed in sea water and from laboratory tests has confirmed the potential of wax coatings but has highlighted two important factors. These are:

(i) that the smoothness of the wax surface is important in reducing drag and requires special care and attention.
(ii) that wax itself has no inherent anti-fouling properties.

The present invention is concerned with a method of applying the wax that gives a smooth surface without subsequent treatment and which facilitates the incorporation of biocides into the wax.

According to the present invention a process for coating a surface intended for underwater use with wax, comprises applying to the surface an aqueous dispersion of a wax.

The use of an aqueous dispersion of a wax has the following advantages over hot spraying 1. The wax can be applied more evenly giving a smooth and, in some cases a glossy, film which may not require buffing or polishing.
2. The thickness of the film can be readily controlled by the viscosity of the dispersion and its water content.
3. The wax can be applied at atmospheric temperature using conventional spraying equipment.
4. Biocidal additives can be easily incorporated, if required. Since the wax is applied cold, there will be less toxic hazard from biocidal vapours and no risk of thermal decomposition of the biocide.

The aqueous wax dispersion may be prepared by emulsifying wax and water at a temperature above the melting point of the wax in the presence of an emulsifying agent, and allowing the emulsion to cool.

The dispersion may contain from 15 to 75% wt of wax by weight of the dispersion, preferably from 25 to 60% wt. It may have a viscosity of from 1.5° E to 75° Engler at 20° C., preferably from 2° E to 50° E. The thickness of the final coating will depend on the viscosity, which controls the flow of the dispersion over the surface, and on the water content, since the thickness will reduce as the water evaporates in proportion to the water content.

By suitable control as above, the final coating may have a thickness of from 5 to 500 micrometers, preferably 50 to 300 micrometers.

The wax coating may be applied to surfaces which have not been painted with anti-fouling paint, but is preferably applied on top of an anti-fouling paint, since the paint will afford protection if areas of the wax coating are accidentally damaged or removed. Wax coatings applied by spraying molten wax are substantially impervious to water at any thickness above 5 micrometers and substantially impervious to biocides at thicknesses above 50 micrometers. Wax coatings applied as aqueous dispersions may, however, be more porous and allow a slow controlled migration of toxins through the wax coating from an underlying anti-fouling paint.

This migration may be appreciable through coatings of 10–49 micrometers thickness and coatings of such relative thinness can be applied using aqueous wax dispersions. However coatings of 50–300 micrometers may still show controlled migration, providing another potential advantage over films applied by other techniques.

A wide range of waxes may be used, but the wax preferably has a melting point of from 45° to 120° C. and a penetration of from 1 to 60 mm×10, as measured by ASTM D1321. Suitable waxes include mineral waxes e.g. paraffin wax, chlorinated paraffin wax microcrystalline wax, slack wax, ozokerite and ceresine, vegetable or animal waxes e.g. carnauba wax, and synthetic waxes, e.g. Fischer-Tropsch wax. Both oxidised and unoxidised waxes may be used, although, as explained hereafter, the method of forming the dispersions may differ. Blends of two or more types of wax can often be chosen to optimize physical properties, particularly gloss.

The emulsifying agent used to form the dispersion may be present in an amount of from 0.2 to 10% wt by weight of the dispersion, preferably from 1.0 to 5.0% wt. The agent used and the amount used is a factor in ensuring that the dispersion is stable and capable of being stored, in controlling the viscosity, in minimising surface tackiness of the finished coating and in minimising the re-dispersion and stripping of the finished coating by sea-water. Preferably, to minimise stripping, the amount of emulsifying agent is kept to a minimum, consistent with providing adequate stability and viscosity.

The emulsifying agent may be anionic, cationic, or non-ionic, but preferably the former, because anionic agents best meet the desiderata set out above. Cationic agents are also useful and non-ionic agents are the least preferred.

Examples of suitable agents may be

Anionic—Amine salts of carboxylic acids, particularly ammoniacal alkylamine, and alkanolamine salts of carboxylic acids having from 4 to 54 carbon atoms. e.g. ammoniacal or ethanolamine salts of stearic or oleic acids.

Cationic—alkylamine hydrohalides, particularly those with alkyl groups having from 4 to 24 carbon atoms, e.g. laurylamine hydrochloride and cetyl trimethyl ammonium bromide.

Non-ionic—sorbitan and sorbitol esters (including oleates) with or without polyoxyethylene groups e.g. the agents sold under the Registered Trade Marks "Span" and "Tween".

Oxidised mineral wax and certain other waxes already contain carboxyl groups so it is only necessary to add a base to form an anionic emulsifying agent. Suitable bases may be as set out above, e.g. ammonia, triethanolamine or morpholine.

The dispersions may be produced by the hot emulsification of molten wax or wax blend and water in the presence of an emulsifying agent. The water may be added to the wax or vice-versa, but preferably water is added to wax so that a water in wax emulsion is first formed, which later inverts to a wax in water emulsion. With anionic agents, the agent is preferably formed in situ, with the base being present in the water phase and the acid in the wax phase. In a further preferment all the base may be added during the first part of the emulsion forming process e.g. the base may all be present in the first 20% of water added to the wax, pure water being added thereafter. The molar ratio of base to acid may be from 1.0 to 3.0.

The emulsion may be formed in any suitable equipment e.g. a Silverson mixer fitted with an emulsifying head.

For good stability and adequate viscosity, the emulsion preferably is a wax in water emulsion with an average wax particle size of from 0.05 to 10 micrometers.

If required biocides may be incorporated during the formation of the emulsion or subsequently. Wax coatings containing biocides are described and claimed in the complete specification of cognate U.K. Patent Applications Nos. 11186/74, 11187/74 and 25085/74 and the present invention may be used in combination with this other invention.

The dispersion may also contain from 1 to 20% wt by weight of the wax of a wax-soluble alkyd or shellac resin to assist in producing a high surface gloss to the wax coating. The resin may be added before the formation of the emulsion or subsequently. Alternatively the same amount of polyethylene or polyvinyl acetate may be used for the same purpose.

The dispersions may be applied by brushing or spraying at atmospheric temperature. Conventional paint spraying equipment may be used.

The present invention includes surfaces intended for underwater use having a wax coating applied as previously described. The surfaces may be ships' hulls or other fixed or moveable underwater surfaces e.g. the legs of offshore drilling rigs and production platforms.

The invention is illustrated by the following examples.

EXAMPLE 1

Effect of Emulsifier Concentration

The following experimental conditions were used.
Wax: Paraffin wax of 60°/62° C. melting point
Mode of Addition: Water to wax
Temperature of addition: 80°
Rate of cooling: Rapid, in ice
Emulsifier: Triethanolamine stearate formed in situ from triethanolamine dissolved in the water and stearic acid in the wax.

| Parts by wt. Wax | Parts by wt. Emulsifier | Parts by wt. Water | Comments |
| --- | --- | --- | --- |
| 35 | 1.5 | 63.5 | Poor emulsification |
| 35 | 2.5 | 62.5 | Fairly stable. After 17 days 10% separation. Re-disperses on shaking. |
| 35 | 3.0 | 62 | After 17 days. 8% |

-continued

| Parts by wt. Wax | Parts by wt. Emulsifier | Parts by wt. Water | Comments |
|---|---|---|---|
|  |  |  | separation. Redisperses on shaking. |
| 35 | 3.5 | 61.5 | After 17 days. 2% separation. Emulsion thick, disperses on stirring. |

Modifying the mode of addition so that all the triethanolamine was added with the first 20% of the water i.e. so that the triethanolamine stearate was formed before the bulk of the water was added, enabled emulsifier concentrations as low as 1.5 and 2.0 parts by weight to be used with the following values of wax particle size.

| Emulsifier content parts per 100 per weight | Wax Particle Size | Separation After 12 days |
|---|---|---|
| 1.5 | 4–8 μm | 22% |
| 2.0 | 12–18 μm | 26% |

EXAMPLE 2

Effect of Emulsifier Type

The following experimental conditions were employed.
 Mode of Application: Water to wax
 Temperature: 85° C.
 Cooling: Rapid, in ice
 Emulsion formulation:
  Parts by wt. of 60°/62° C. Paraffin Wax—20
  Parts by wt of Emulsifier—2

| Emulsifier | Stability of Dispersion | Viscosity | PROPERTIES OF SPRAYED FILM Cohesive and Adhesive properties | Life in sea water |
|---|---|---|---|---|
| Ammonium Stearate (anionic) | Very good | thick >50° E | Good | Good |
| Laurylamine Hydrochloride (cationic) | Moderate but easily redispersed | very thin 3° E | Good | Good |
| Span 80 Tween 80 mixture, with + *HLB = 10 (non-ionic) | Very small separation overnight | thin 10°E | Sprayed film has a long drying time (48 hrs.) and is relatively soft | Moderate |

*hydrophile - lypophile balance

The films were produced by spraying the dispersions onto steel plates using a DeVilbes paint spray gun at an air pressure of 35 psig.

It will be seen that both anionic and cationic emulsifiers gave good wax films and that the anionic emulsifier gave a stable dispersion. The cationic dispersion was a less stable thinner dispersion but it could be readily redispersed. The non-ionic emulsifier gave a stable dispersion but only moderate film properties.

EXAMPLE 3

Anti-Fouling Properties of Wax Films

Dispersions prepared from paraffin wax and ammonium stearate as in Example 2 were sprayed onto two steel plates, one painted with "Latenac" anti-fouling paint and one painted with an ordinary anti-corrosion paint. The wax films on each plate were 80–120 micrometers thick.

The plates were immersed in sea water at Singapore for 6 weeks and then examined. The plate of wax on top of ordinary paint was fouled by barnacles and hydroids; the plate of wax on top of anti-fouling paint was free of any growth. The wax coating produced from an aqueous dispersion was thus sufficiently porous to allow the controlled leaching of toxins from the underlying anti-fouling paint.

EXAMPLE 4

Effect of Viscosity on Coating Thickness

Dispersions were formed as in Example 2, but using different amounts of emulsifier to give dispersions of differing viscosity. The dispersions were sprayed onto steel plates as in Example 2. The table below shows how the thickness of the film can be varied by varying the viscosity.

| | Emulsifier: triethanolamine stearate | | |
|---|---|---|---|
| Parts by wt. Paraffin wax | Parts by wt. Emulsifier | Viscosity | Thickness of Sprayed film |
| 25 | 5 | 20° E | 150μ |
| 35 | 1.5 | 5° E | 80μ |
| 35 | 2.5 | 15° E | 120 |
| 35 | 3.5 | 50° E | 200μ |

All the films had smooth surfaces, the surface roughness being less than 3 center line average.

We claim:

1. In a process for the production of a corrosion and fouling resistant underwater surface which is in continuous contact with water and which has been coated with wax; the improvement comprising applying said wax to said underwater surface as an aqueous dispersion consisting essentially of from 25 to 60% wt. of wax by weight of the dispersion and an emulsifying agent, said aqueous dispersion being a wax in water emulsion having an average wax particle size of from 0.05 to 10 micrometers, the finished wax coating having a thickness of from 5 to 500 micrometers.

2. A process according to claim 1 wherein the dispersion has a viscosity of from 2° to 50° E.

3. A process according to claim 1 wherein the finished wax coating has a thickness of from 50 to 300 micrometers.

4. A process according to claim 1 wherein the finished wax coating has a thickness of from 10 to 49 micrometers.

5. A process according to claim 1 wherein the wax has a melting point of from 45° to 120° C. and a penetration of from 1 to 60 mm×10 as measured by ASTM D1321.

6. A process according to claim 5 wherein the wax is a mineral wax.

7. A process according to claim 1 wherein the dispersion is formed by emulsifying water and wax at a temperature above the melting point of the wax and cooling the emulsion.

8. A process according to claim 7 wherein the amount of emulsifying agent is from 0.2 to 10%, by weight of the dispersion.

9. A process according to claim 7 wherein the emulsifying agent is anionic.

10. A process according to claim 7 wherein water is added to wax to form the emulsion.

11. A process according to claim 9 wherein the acid portion of the anionic emulsifying agent is in the wax and the base portion in the water.

12. A process according to claim 11 wherein all of the base portion is present in the first 20% of the water added.

13. An underwater surface produced in accordance with the process of claim 1.

* * * * *